(12) United States Patent
Sasaki et al.

(10) Patent No.: US 12,047,660 B2
(45) Date of Patent: Jul. 23, 2024

(54) INFORMATION PROCESSING APPARATUS, INFORMATION PROCESSING METHOD, AND PROGRAM

(71) Applicant: SONY CORPORATION, Tokyo (JP)

(72) Inventors: Takahiro Sasaki, Kanagawa (JP); Hiroaki Kitano, Saitama (JP)

(73) Assignee: SONY CORPORATION, Tokyo (JP)

(*) Notice: Subject to any disclaimer, the term of this patent is extended or adjusted under 35 U.S.C. 154(b) by 132 days.

(21) Appl. No.: 16/629,246

(22) PCT Filed: Apr. 27, 2018

(86) PCT No.: PCT/JP2018/017187
§ 371 (c)(1),
(2) Date: Jan. 7, 2020

(87) PCT Pub. No.: WO2019/012784
PCT Pub. Date: Jan. 17, 2019

(65) Prior Publication Data
US 2020/0204874 A1 Jun. 25, 2020

(30) Foreign Application Priority Data
Jul. 14, 2017 (JP) .................................. 2017-138489

(51) Int. Cl.
*G06F 17/00* (2019.01)
*H04N 21/442* (2011.01)
(Continued)

(52) U.S. Cl.
CPC ... *H04N 21/8113* (2013.01); *H04N 21/44222* (2013.01); *H04N 21/4668* (2013.01); *H04N 21/812* (2013.01)

(58) Field of Classification Search
CPC ......... H04N 21/8113; H04N 21/44222; H04N 21/4668; H04N 21/812
(Continued)

(56) References Cited

U.S. PATENT DOCUMENTS

| 7,754,959 B2* | 7/2010 | Herberger | ............... G10H 1/368 |
| | | | 84/622 |
| 2003/0221541 A1* | 12/2003 | Platt | ..................... G06F 16/4387 |
| | | | 707/E17.009 |

(Continued)

FOREIGN PATENT DOCUMENTS

| CN | 101080763 A | 11/2007 |
| CN | 106302678 A | 1/2017 |

(Continued)

OTHER PUBLICATIONS

Foxwell, Composing with Algorithms: Two Novel Generative Composition Tools (Year: 2012).*

(Continued)

*Primary Examiner* — Paul C McCord
(74) *Attorney, Agent, or Firm* — Paratus Law Group, PLLC

(57) ABSTRACT

There is provided an information processing apparatus, an information processing method, and a program capable of analyzing a user evaluation on a part of a content, and generating preference information capable of realizing satisfying content recommendation. The information processing apparatus includes a control unit configured to generate a user evaluation on a chronologically-separated part of a media content, on the basis of sensor data on a user, the sensor data being acquired in relation to listening and viewing of the media content, and store media preference information including at least the generated user evaluation in a storage unit.

16 Claims, 6 Drawing Sheets

(51) Int. Cl.
*H04N 21/466* (2011.01)
*H04N 21/81* (2011.01)

(58) Field of Classification Search
USPC .......................................................... 700/94
See application file for complete search history.

(56) References Cited

U.S. PATENT DOCUMENTS

| | | | | |
|---|---|---|---|---|
| 2005/0021470 | A1* | 1/2005 | Martin | G11B 27/002 705/51 |
| 2007/0291958 | A1* | 12/2007 | Jehan | G10H 1/0025 381/103 |
| 2008/0215599 | A1* | 9/2008 | Yun | G06Q 30/00 |
| 2008/0249644 | A1* | 10/2008 | Jehan | G11B 27/322 700/94 |
| 2013/0204813 | A1* | 8/2013 | Master | G06N 20/00 706/12 |
| 2014/0180674 | A1* | 6/2014 | Neuhauser | G10H 1/0008 704/9 |
| 2015/0271571 | A1 | 9/2015 | Laksono et al. | |
| 2016/0171864 | A1 | 6/2016 | Ciaramelletti et al. | |
| 2016/0197967 | A1* | 7/2016 | Kreifeldt | G06V 40/172 709/204 |
| 2016/0343410 | A1* | 11/2016 | Smith | G11B 27/15 |
| 2017/0092247 | A1* | 3/2017 | Silverstein | G10L 25/15 |
| 2018/0349492 | A1* | 12/2018 | Levy | G06N 3/084 |
| 2020/0204874 | A1* | 6/2020 | Sasaki | G06F 16/9535 |

FOREIGN PATENT DOCUMENTS

| | | |
|---|---|---|
| JP | 2007-133947 A | 5/2007 |
| JP | 2007241924 A | 9/2007 |
| JP | 2015-008014 A | 1/2015 |
| KR | 20090001745 A | 1/2009 |
| WO | WO-2017033220 A1 | 3/2017 |

OTHER PUBLICATIONS

Apr. 20, 2020, European Search Report issued for related EP application No. 18832586.4.

Sugimoto et al., Music Recommendation System that Predicts Affective Changes Based on Brain Wave Analysis, The 23$^{rd}$ Annual Conference of the Japanese Society for Artificial Intelligence, 2009, pp. 1-4, Kagawa, Japan.

Sugimoto et al., Automatic composition by acquisition of Kansei based on analysis of brain waves, The 21$^{st}$ Annual Conference of the Japanese Society for Artificial Intelligence, 2007, pp. 1-4, Miyazaki, Japan.

Shigeyuki Hirai, et al., "Web 2.0 Applications for Held Music and Listening Locations"; "Information Processing Society of Japan report of research, Japan, Information Processing Society of Japan, May 10, 2007, the 2007th volume, No. 37, and p. 109-116").

* cited by examiner

TODAY'S LIST OF RECOMMENDED MUSICAL COMPOSITIONS

LIVING ROOM
- ○○○○(TITLE)
- ○○○○(TITLE)
- ○○○○(TITLE) – Auto.
- ○○○○(TITLE)
...

KITCHEN
- ○○○○(TITLE) – Auto.
- ○○○○(TITLE) – Auto.
- ○○○○(TITLE)
- ○○○○(TITLE)
...

ON WAY TO WORK
- ○○○○(TITLE)
- ○○○○(TITLE)
- ○○○○(TITLE) – Auto.
- ○○○○(TITLE) – Auto.
...

RUNNING
- ○○○○(TITLE)
- ○○○○(TITLE) – Auto.

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/017187 (filed on Apr. 27, 2018) under 35 U.S.C. § 371, which claims priority to Japanese Patent Application No. 2017-138489 (filed on Jul. 14, 2017), which are all hereby incorporated by reference in their entirety.

FIELD

The present disclosure relates to an information processing apparatus, an information processing method, and a program.

BACKGROUND

In recent years, various media contents, such as music and video, are increasingly used as digital contents. When a user selects a desired content from among a plurality of contents, for example, a method of visually selecting a content from a list including details of contents, a method of searching for a content by using metadata added to digital contents, or the like may be applicable.

Further, as described in Patent Literature 1 as listed below, a method of recommending a content suitable for a user by using preference information, history information, or the like on the user has been known.

CITATION LIST

Patent Literature

Patent Literature 1: JP 2015-008014 A

SUMMARY

Technical Problem

However, even a media content (in this specification, also simply referred to as a "content") that a user prefers may include a part that the user does not prefer, or the user sometimes prefers a content but sometimes does not prefer the same content depending on listening situations. In the conventional technology, only information, such as preference on contents or content categories, or listening history (the number of times of listening or the like), has been recognized as preference information that indicates a preference tendency of the user, but specific situations of the user at the time of listening and preference on each of parts of a content has not been taken into account.

Therefore, in the present disclosure, an information processing apparatus, an information processing method, and a program capable of analyzing a user evaluation on a part of a content and generating preference information capable of realizing satisfying content recommendation are proposed.

Solution to Problem

According to the present disclosure, an information processing apparatus is provided that includes: a control unit configured to generate a user evaluation on a chronologically-separated part of a media content, on the basis of sensor data on a user, the sensor data being acquired in relation to listening and viewing of the media content, and store media preference information including at least the generated user evaluation in a storage unit.

According to the present disclosure, an information processing method is provided that causes a processor to execute: generating a user evaluation on a chronologically-separated part of a media content, on the basis of sensor data on a user, the sensor data being acquired in relation to listening and viewing of the media content; and storing media preference information including at least the generated user evaluation in a storage unit.

According to the present disclosure, a program is provided that causes a computer to function as a control unit that executes: generating a user evaluation on a chronologically-separated part of a media content, on the basis of sensor data on a user, the sensor data being acquired in relation to listening and viewing of the media content; and storing media preference information including at least the generated user evaluation in a storage unit.

Advantageous Effects of Invention

As described above, according to the present disclosure, it is possible to analyze a user evaluation on a part of a content and generate preference information capable of realizing satisfying content recommendation.

Further, the effects described in this specification are merely illustrative or exemplified effects, and are not limitative. That is, with or in the place of the above effects, the technology according to the present disclosure may achieve other effects that are clear to those skilled in the art from the description of this specification.

BRIEF DESCRIPTION OF DRAWINGS

FIG. 5 is an example of a display screen of a recommended musical composition list according to the present embodiment.

DESCRIPTION OF EMBODIMENTS

Preferred embodiments of the present disclosure will be described in detail below with reference to the accompanying drawings. In this specification and the drawings, structural elements that have substantially the same functions and configurations will be denoted by the same reference symbols, and repeated explanation of the structural elements will be omitted.

In addition, hereinafter, explanation will be given in the following order.

1. Outline of information processing system according to one embodiment of present disclosure
2. Configuration
3. Operation processing
4. Examples of display screen
5. Supplemental explanation
6. Conclusion

1. OUTLINE OF INFORMATION PROCESSING SYSTEM ACCORDING TO ONE EMBODIMENT OF PRESENT DISCLOSURE

Figure 1:
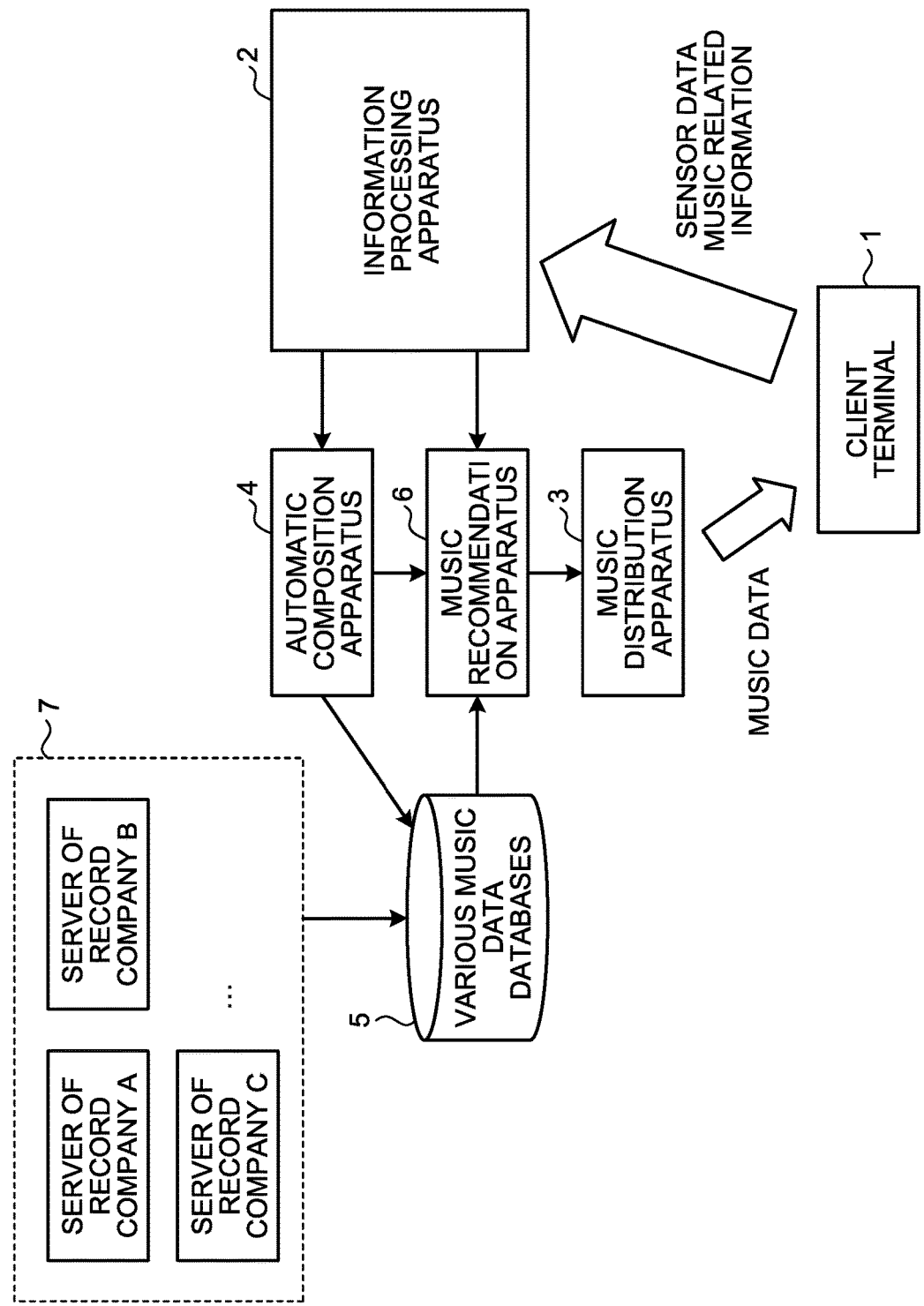
FIG. 1 is a diagram for explaining an outline of an information processing system according to one embodiment of the present disclosure.

FIG. 1 is a diagram for explaining an outline of an information processing system according to one embodiment of the present disclosure. As illustrated in FIG. 1, the information processing system according to the present embodiment includes a client terminal 1, and a user is able to, by the client terminal 1, listen to music that is distributed from a music distribution apparatus 3. The client terminal 1 is able to establish communication and transmit/receive data with respect to the music distribution apparatus 3 and an information processing apparatus 2 via a network.

The client terminal 1 may perform, for example, streaming replay of replaying music data while obtaining the music data from the music distribution apparatus 3. The client terminal 1 may be, for example, a smartphone, a mobile phone terminal, a tablet terminal, a personal computer (PC), a wearable device (an head mounted display (HMD), a smart eyeglass, a smartwatch, a smart band, a smart neck, a neck speaker, smart earphones, an earring speaker, an ear cuff speaker, or the like), a standing speaker, a headphone device, or the like.

Further, the user is able to use a music recommendation apparatus 6, obtain automatically-selected music from the music distribution apparatus 3, and listen to the music. The music recommendation apparatus 6 is able to recommend music depending on, for example, a user attribute or a personal preference of the user. The music to be recommended may be selected from various music data databases (DBs) 5 in which pieces of music information licensed by corresponding record companies are stored, for example.

Here, in a conventional music recommendation system, it has been possible to obtain a history that indicates when and what kind of music was listened to by the user, but it has been difficult to fully obtain information on a situation in which the user listened to the music.

For example, even if statistics on time periods during which music is listened to are collected, favorite music that a user often listens to in a living room at night and favorite music that the user listens to while the user runs at night may be different; however, conventionally, it has been difficult to obtain a user situation (user behavior) at the time of listening, so that the granularity of preference information on the user has been large and optimal music recommendation has not been made in a satisfying manner.

Therefore, in the present embodiment, various sensors acquire user situations (behaviors) while the user is listening to music using the client terminal 1, and sensor data is transmitted to the information processing apparatus 2 (analysis apparatus), so that the information processing apparatus 2 is able to analyze preference information with high accuracy.

Specifically, the information processing apparatus 2 acquires a user evaluation on each of parts of music data by analyzing a user behavior at the time of listening to music, and generates a database as preference information, on the basis of various kinds of sensor data acquired as above. The client terminal 1 may transmit information (a title, musical composition data, a part of musical composition data, or the like) on the listened music to the information processing apparatus 2 together with the sensor data, and thus the information processing apparatus 2 is able to analyze musical parts.

As described above, even music that the user prefers contains a part (melody, rhythm, harmony, or the like) that the user does not prefer; therefore, by analyzing a user preference on each of parts, such as melody, rhythm, or harmony, as components of music data, and generating the user preference on the parts as preference information, it is possible to recommend music with high accuracy. Further, the preference information is associated with user situations. Therefore, for example, it is possible to generate the preference information with high granularity, such as melody, rhythm, or harmony of music that the user prefers while the user relaxes in a living room at night, and such as melody, rhythm, or harmony of music that the user prefers while the user runs at night.

By causing the music recommendation apparatus 6 to recommend music based on the preference information generated as described above, it is possible to increase recommendation accuracy (optimize music recommendation). In other words, the music recommendation apparatus 6 is able to perform machine learning based on the preference information on the user generated by the information processing apparatus 2, and recommend optimal music depending on situations of the user. Meanwhile, the music recommendation apparatus 6 according to the present embodiment may have a function to provide advertising to the user, and may be able to provide optimal advertising based on the preference information with high granularity as described above (by performing machine learning), and increase an advertising effect (optimization of advertising).

Further, the music recommendation apparatus 6 may also adopt, as a recommendation target, music data that is generated by an automatic composition apparatus 4 that automatically composes music. A composition algorithm used by the automatic composition apparatus 4 is not specifically limited, but, for example, it is possible to generate musical composition by combining parts and appropriately performing modification on the basis of a designated theme, a designated genre, or a designated type of a predetermined part (melody, rhythm, harmony, or the like) of music. The automatic composition apparatus 4 is able to compose appropriate music in accordance with a user situation on the basis of the preference information generated by the information processing apparatus 2, i.e., the preference information that includes at least a user evaluation on a part of music and a corresponding user situation. The automatically-composed music data may be stored in the various music data DBs 5, or may be generated in real time in accordance with the user situation and output to the music recommendation apparatus 6.

The outline of the information processing system according to one embodiment of the present disclosure has been described above. Meanwhile, each of the information processing apparatus 2, the music distribution apparatus 3, the automatic composition apparatus 4, the various music data DBs 5, and the music recommendation apparatus 6 illustrated in FIG. 1 may be realized by a server on a network. Further, a plurality of apparatuses may be realized by a single server. For example, it may be possible to construct a music recommendation server that has the functions of the information processing apparatus 2, the automatic composition apparatus 4, and the music recommendation apparatus 6. A detailed configuration of the information processing apparatus 2 included in the information processing system according to the present embodiment will be described below with reference to the drawings.

2. CONFIGURATION

Figure 2:
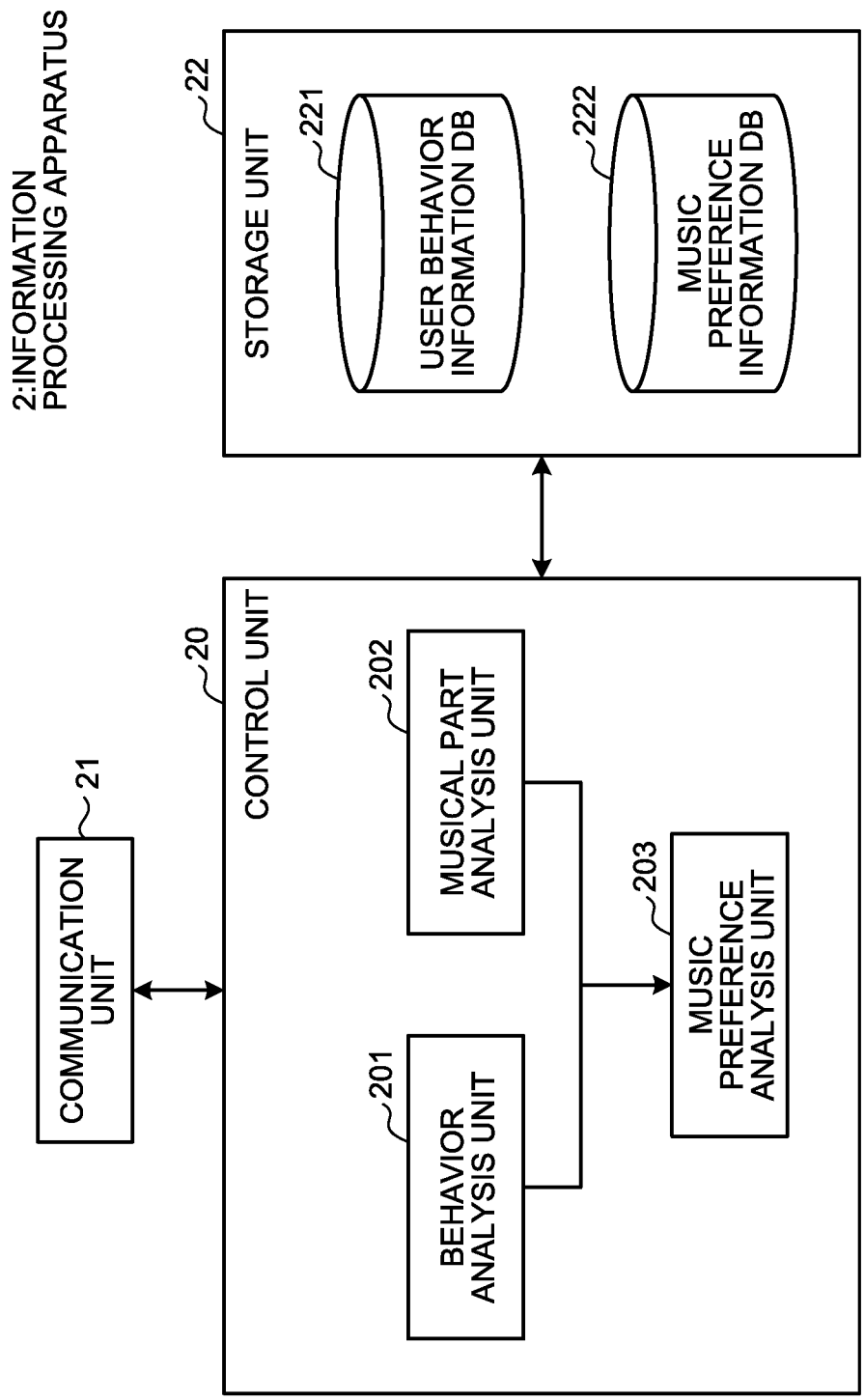
FIG. 2 is a diagram illustrating an example of a configuration of an information processing apparatus according to the present embodiment.

FIG. 2 is a block diagram illustrating an example of a configuration of the information processing apparatus 2 according to the present embodiment. As illustrated in FIG. 2, the information processing apparatus 2 includes a control unit 20, a communication unit 21, and a storage unit 22.

The control unit 20 functions as an arithmetic processing apparatus and a control apparatus, and controls the entire operation in the information processing apparatus 2 in accordance with various programs. The control unit 20 is realized by, for example, an electronic circuit, such as a central processing unit (CPU) or a microprocessor. Further, the control unit 20 may include a read only memory (ROM) for storing programs, calculation parameters, or the like that are to be used, and a random access memory (RAM) for temporarily storing parameters or the like that are changed appropriately.

Furthermore, the control unit 20 according to the embodiment also functions as a behavior analysis unit 201, a musical part analysis unit 202, and a music preference analysis unit 203.

The behavior analysis unit 201 analyzes a user behavior at the time of viewing and listening, on the basis of various kinds of sensor data on the user at the time of viewing and listening to a content (music is adopted as one example in the present embodiment). Here, various kinds of sensor data on the user at the time of viewing and listening may include location information, motion information (acceleration sensor data, gyroscope sensor data, geomagnetic sensor data, or the like), biological information (a pulse, a heartbeat, a vein, diaphoresis, blood pressure, body temperature, breathing, brain wave, power saving, a fingerprint, a vein pattern, or the like), user speech information, gesture information, a captured image, environmental information (air temperature, illuminance, rain, wind, ambient sound, or the like), a date and time, a season, viewing/listening operation information (replay, stop, skip, or the like), and the like.

The location information indicates a location of a user at the time of viewing and listening to a content, and may indicate an indoor area, an outdoor area, a location in a room, a location in an outdoor area (latitude and longitude), or the like. The location information may be detected by a location positioning unit. Here, the location positioning unit has a function to detect a current location on the basis of an externally-acquired signal. Specifically, for example, the location positioning unit is realized by a global navigation satellite system (GNSS) positioning unit, receives radio waves from satellites, detects a current location, and outputs information on the detected location. Further, the location positioning unit may be a device that detects a location through transmission/reception, near-field communication, or the like using Wi-Fi (registered trademark), Bluetooth (registered trademark), a mobile phone, a portable handyphone system (PHS), or a smartphone, instead of GNSS.

The sensor data as described above may be acquired by various sensors (a location positioning unit, a motion sensor (an acceleration sensor or a geomagnetic sensor), a biological sensor, a camera, a microphone, an environmental sensor, or the like), by an operation detection unit (a touch sensor, a pressure sensor, a proximity sensor, a button, a switch, a lever, and the like), or by a device (a standing speaker, a monitoring camera, or the like) installed around the user. Further, the sensor data acquired by the information processing apparatus 2 may be original sensor data as detected by each of the sensors, or may be processed data, such as data analyzed based on one or more pieces of sensor data.

The behavior analysis unit 201 analyzes, from the sensor data or the like, various situations of the user related to listening to music, e.g., a place, a company, a behavior, a time period, or weather while the user listens to the music, an emotional change during listening (emotions may be estimated from biological sensor data, voice of speech, motion, or the like), a type of each piece of music and a degree of replay of the piece of music (to which syllable the piece of music is replayed), the number of repetitions of each piece of music, or the like. In the behavior analysis as described above, not a single analysis result is output for a single piece of music, but time-series analysis results (user reactions) with respect to a single piece of music are output. In other words, for example, types of behaviors and types of syllables associated with the behaviors may be analyzed, or types of behaviors and elapsed times at which the behaviors are taken after replay is started may be analyzed. The analysis results obtained by the behavior analysis unit 201 are stored in a user behavior information DB 221. Meanwhile, various kinds of sensor data on the user at the time of listening to the music may also be stored in the user behavior information DB 221.

The musical part analysis unit 202 analyzes musical parts of the music listened to by the user. In other words, the musical part analysis unit 202 analyzes "parts" of the music, in particular, components of the music, such as melody, rhythm, and harmony, composed of one or more syllables, on the basis of music related information (a title, musical composition data, a part of musical composition data, or the like) of the music listened to by the user.

The music preference analysis unit 203 generates a user evaluation (positive evaluation or negative evaluation that varies depending on circumstances) on a chronologically-separated part (i.e., a musical part, such as melody, rhythm, or harmony) of a content, on the basis of an analysis result obtained by the behavior analysis unit 201 and an analysis result obtained by the musical part analysis unit 202. In other words, the preference information is generated by associating a user evaluation, which indicates a type of a certain situation and a musical part that the user prefers in the certain situation, with a user situation (the user is cooking in the kitchen, is relaxed in a dining room, is running, is on the way to work, or the like). The music preference analysis as described above is performed for each piece of listened music; however, it may be possible to further generate user evaluations on the same or similar parts on the basis of each of evaluation results on a large number of pieces of music listened to by the user. In this case, the music preference analysis unit 203 may be able to make user evaluations by machine learning using the deep learning, for example. With this configuration, it becomes possible to perform labeling on musical parts (chronological labeling on music). Further, the music preference analysis unit 203 may be able to tag emotional changes of the user to parts of a musical composition on the basis of estimation of emotions, e.g., estimation of emotions based on brain waves (delightful, unhappy, happy, joyful, painful, or the like). Each of the analysis results obtained by the music preference analysis unit 203 as described above is stored, as music preference information on the user, in a music preference information DB 222.

Furthermore, the music preference analysis unit 203 may be able to use music preference information on a number of users and analyze music preference information for each of groups that are classified based on features of the users. The features of the users are what is called attributes, and may be an age, an age category, gender, a hometown, a nationality, a race, occupation, a behavior pattern, a lifestyle, a hobby, and a preference of each of the users. With use of the preference information on each of the groups that are generated based on pieces of music preference information on a number of users, it is possible to recommend music that fits a situation and a preference of a user in accordance with tendencies of a number of users.

Meanwhile, the music preference analysis unit 203 according to the present embodiment is of course able to analyze a user evaluation (positive/negative) on a music genre, a composer, a singer, or the like for each piece of music, in addition to analyzing a user evaluation on each of musical parts.

Communication Unit 21

The communication unit 21 is connected to an external apparatus in a wired or wireless manner, and transmits and received data to and from the external apparatus. The communication unit 21 is able to establish communication with the external apparatus via, for example, a wired/wireless local area network (LAN), Wi-Fi (registered trademark), Bluetooth (registered trademark), near-field wireless communication, a mobile communication network (long term evolution (LTE), 3G (the third generation of wireless mobile telecommunications technology)) or the like.

For example, the communication unit 21 receives the sensor data and the music related information (a title, musical composition data, a part of musical composition data, or the like) from the client terminal 1 via a network. Further, the communication unit 21 is also able to transmit the analyzed music preference information in response to a request from the automatic composition apparatus 4 or the music recommendation apparatus 6.

Storage Unit 22

The storage unit 22 is realized by a read only memory (ROM) for storing programs, calculation parameters, and the like that are used in processing performed by the control unit 20, and a random access memory (RAM) for temporarily storing parameters or the like that are appropriately changed.

The storage unit 22 according to the preset embodiment stores therein the user behavior information database (DB) 221 and the music preference information DB 222. The user behavior information DB 221 stores therein an analysis result that is obtained for each of users by the behavior analysis unit 201 as described above. Further, various kinds of sensor data on each of the users at the time of listening to music is also stored in the user behavior information DB 221.

The music preference information DB 222 stores therein an analysis result obtained by the music preference analysis unit 203. The analysis result indicates a user evaluation on a musical part for each of the users, and is associated with a user situation (a time, a user behavior, a place, a company, a season, weather, or the like). Further, music preference information for each of user types that are classified into groups is stored in the music preference information DB 222.

The configuration of the information processing apparatus 2 according to the present embodiment has been described in detail above. The configuration of the information processing apparatus 2 illustrated in FIG. 2 is one example, and the present embodiment is not limited thereto. For example, at least a part of the components of the information processing apparatus 2 may be included in an external apparatus, or at least a part of the functions of the control unit 20 may be realized by the client terminal 1 or by an information processing apparatus (for example, what is called an edge server) that is located at a relatively short communication distance from the client terminal 1. By appropriately distributing the components of the information processing apparatus 2 as described above, it is possible to improve real-time property, reduce processing loads, and ensure security. Furthermore, all of the components included in the control unit 20 and the DBs illustrated in FIG. 2 may be installed in the client terminal 1, and the preference information analysis process according to the present embodiment may be executed by an application of the client terminal 1.

3. OPERATION PROCESSING

Next, operation processing performed by the information processing system according to the present embodiment will be described in detail with reference to the drawings.

Figure 3:
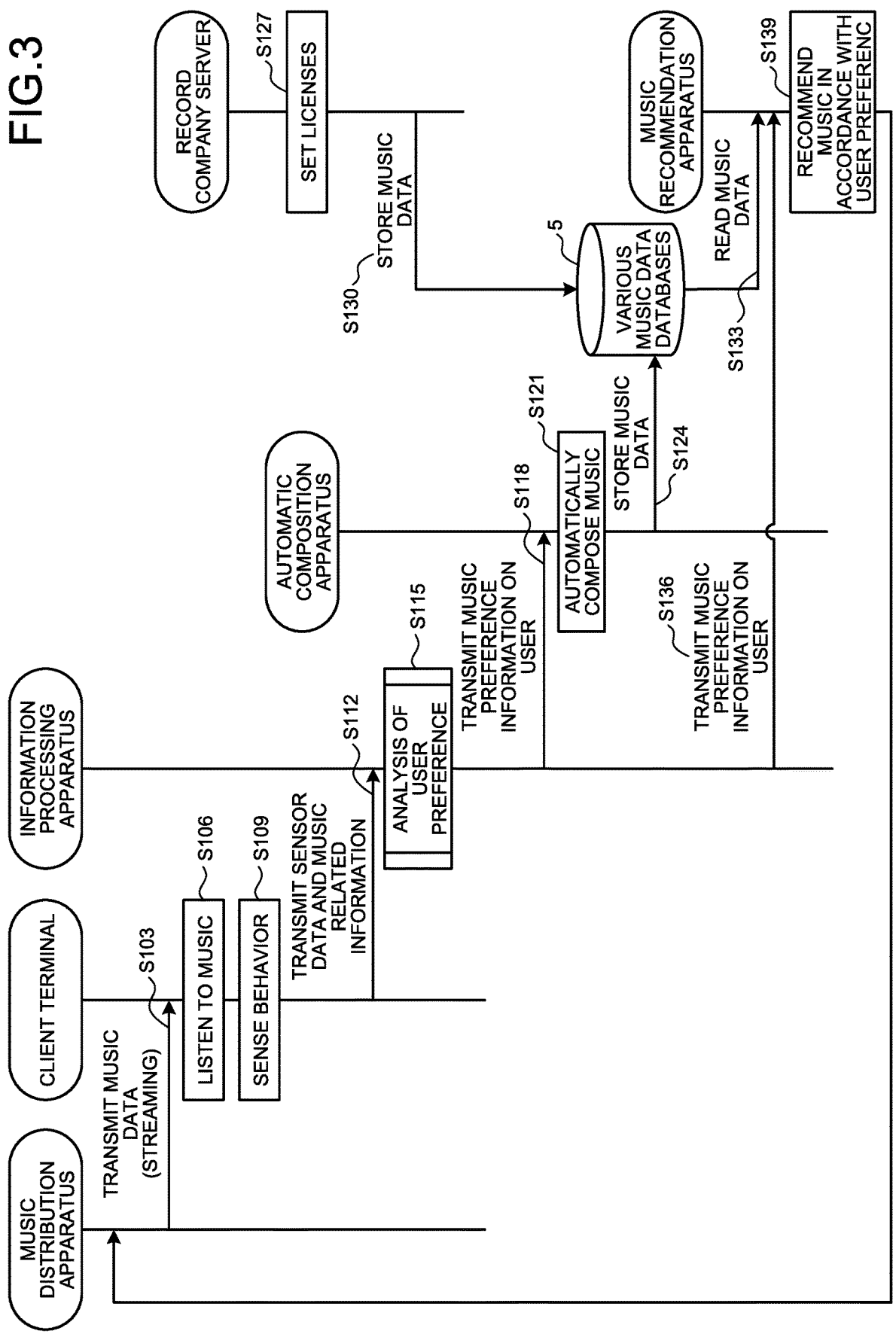
FIG. 3 is a sequence diagram illustrating operation processing performed by a music recommendation system according to the present embodiment.

FIG. 3 is a sequence diagram illustrating the operation processing performed by a music recommendation system according to the embodiment.

As illustrated in FIG. 3, first, the music distribution apparatus 3 transmits music data to the client terminal 1 (Step S103).

Subsequently, the client terminal 1 replays the music data in a streaming manner to allow a user to listen to the music data (Step S106), and simultaneously senses a user behavior (situation) at the time of listening (Step S109).

Then, the client terminal 1 transmits sensor data obtained by the sensing and information related to the listened music to the information processing apparatus 2 (Step S112).

Subsequently, the information processing apparatus 2 analyzes a user preference related to music on the basis of the received sensor data and the received music related information (Step S115). The music preference information that is an analysis result of the user preference is used by, for example, the music recommendation apparatus 6 and used to recommend optimal music depending on the situation and the preference of the user. Further, the automatic composition apparatus 4 may generate and recommend optimal music depending on the situation and the preference of the user.

Specifically, for example, the information processing apparatus 2 transmits the music preference information as an analysis result of the user preference to the automatic composition apparatus 4 (Step S118).

Then, the automatic composition apparatus 4 automatically composes music that fits the situation and the preference of the user on the basis of the music preference information on the user (Step S121), and stores the generated music data in the various music data DBs 5 (Step S124). For example, the automatic composition apparatus 4 may refer to the music preference information acquired from the information processing apparatus 2, and automatically compose similar music (with similar tone) on the basis of a musical part or a musical genre that the user prefers in a certain user situation. The user situation is added as metadata to the automatically-composed music data. Here, the automatic composition apparatus 4 is able to compose music on the basis of not only an evaluation made by the user, but also an evaluation made by a different user. For example, it may be possible to generate music corresponding to the user situation on the basis of an evaluation (music preference information) made by a different user who has a certain feature (an attribute, a behavior pattern, a preference, or the like) similar to that of the user, or may simply use an evaluation made by a different user without depending on the features of the user.

In contrast, a record company server 7 arbitrarily sets licenses for musical compositions (Step S127), and stores music data for which licenses have been set in the various music data DBs 5 (Step S130).

Subsequently, the music recommendation apparatus 6 reads the music data from the various music data DBs 5 (Step S133), refers to the music preference information on the user transmitted from the information processing apparatus 2 (Step S136), and recommends music in accordance with the user preference and the user situation (Step S139). For example, the music recommendation apparatus 6 recommends music in accordance with the user preference and the user situation on the basis of the metadata of the music data stored in the various music data DBs 5. The metadata of the music data includes information on musical parts, for example. The music recommendation apparatus 6 is able to select music data that (relatively largely) includes an appropriate musical part (i.e., that the user prefers) in accordance with the user situation on the basis of the information on musical parts. In this case, it may be possible to eliminate music data that includes a musical part that the user does not prefer. Further, the music recommendation apparatus 6 may select music data by additionally referring to preference information on a music genre, an artist, or the like that the user prefers for each of user situations. Therefore, the music recommendation apparatus 6 is able to generate, for example, a music list to be recommended when the user works in the kitchen, a music list to be recommended when the user sits on the sofa in a dining room, a music list to be recommended at the time of running, or the like. Meanwhile, the music recommendation apparatus 6 may refer to music preference information on a group corresponding to a feature of the user, in addition to the personal music preference information on the user. Further, the music recommendation apparatus 6 is able to make a recommendation by using an evaluation made by a different user, in addition to using an evaluation made by the user. For example, it may be possible to recommend music that fits the user situation on the basis of an evaluation made by a different user who has a certain feature (an attribute, a behavior pattern, a preference, or the like) similar to that of the user, or it may be possible to simply use an evaluation made by a different user without depending on the features of the user. The music data recommended as described above is provided from the music distribution apparatus 3 to the client terminal 1 at Step S103 as described above.

In the music recommendation system according to the present embodiment, processes from Step S103 to S139 as described above are repeated, so that it is possible to continuously store the music preference information on the user and improve accuracy of music recommendation.

The music preference information on the user may be used to provide advertising, although this is not illustrated in the flowchart in FIG. 3. For example, if the music recommendation apparatus 6 also has an advertising function, it is expected to recommend optimal music, and improve an advertising effect by providing advertising related to the recommended music.

Figure 4:
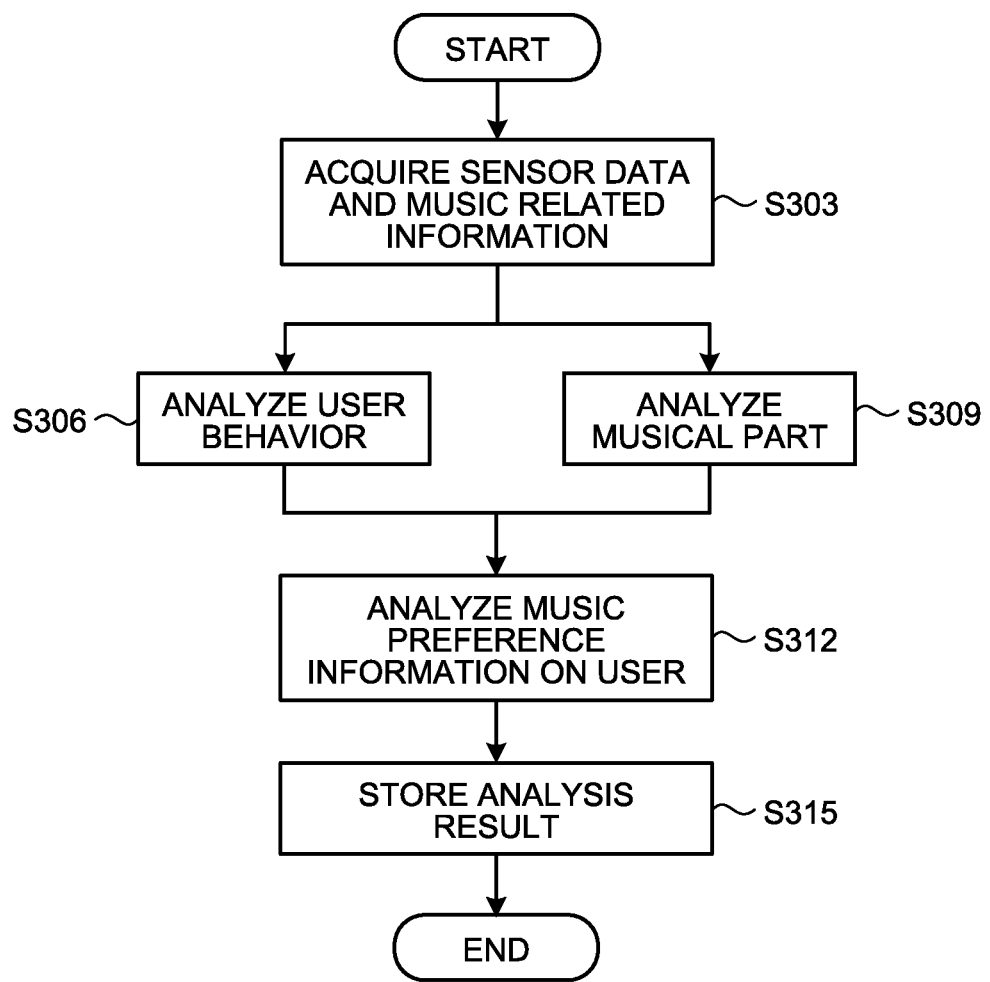
FIG. 4 is a flowchart illustrating a preference information analysis process performed by the information processing apparatus according to the present embodiment.

Next, the analysis process performed by the information processing apparatus 2 at Step S115 as described above will be described in detail with reference to FIG. 4. FIG. 4 is a flowchart illustrating the analysis process performed by the information processing apparatus 2 according to the present embodiment.

As illustrated in FIG. 4, first, if the information processing apparatus 2 acquires the sensor data and the music related information while the user listens to the music (Step S303), the behavior analysis unit 201 analyzes the user behavior (Step S306), and the musical part analysis unit 202 analyzes musical parts (Step S309).

Subsequently, the information processing apparatus 2 causes the music preference analysis unit 203 to analyze music preference information on the user (Step S312), and stores an analysis result in the storage unit 22 (Step S315).

4. EXAMPLES OF A DISPLAY SCREEN

Next, examples of a display screen on the client terminal 1 in a case where music is recommended using the preference information according to the present embodiment will be described with reference to FIG. 5 and FIG. 6.

FIG. 5 is an example of a display screen of a recommended musical composition list according to the present embodiment. On a display screen 110 illustrated in FIG. 5, recommended musical composition lists that fit a plurality of situations corresponding to respective behavior patterns of the user, such as staying in the living room, spending in the kitchen, on the way to work, and running. The recommended musical composition lists may be generated by the music recommendation apparatus 6. Further, recommended musical compositions that fit to each of the situations are selected based on the music preference information (which indicates preferences that are analyzed based on sensing data and that vary depending on situations, and which includes a user evaluation on at least a musical part) on the user or on a group corresponding to a feature of the user.

Meanwhile, a musical composition that is automatically composed based on the preference information on the user may be clearly indicated by, for example, "Auto." so as to be distinguished from known musical compositions (musical compositions provided with licenses given by record companies).

Figure 6:
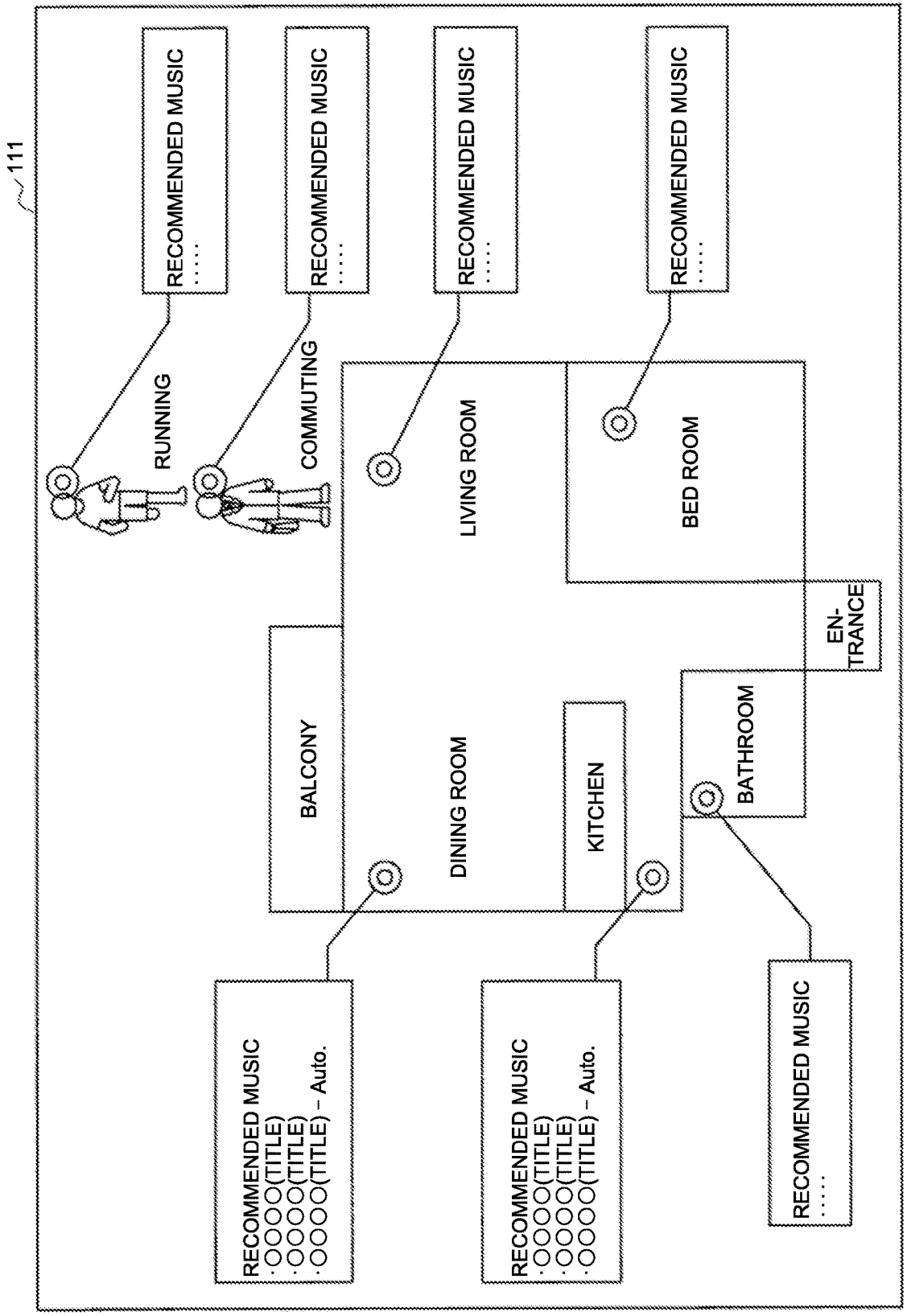
FIG. 6 is another example of the display screen of the recommended musical composition list according to the present embodiment.

FIG. 6 is another example of the display screen of the recommended musical composition list according to the present embodiment. On a display screen 111 illustrated in FIG. 6, recommended musical composition lists that fit situations (locations) are displayed on a map image of a room layout, for example. With this configuration, the user is able to intuitively recognize recommended musical composition lists that fit the situations.

Meanwhile, the recommended musical composition lists provided to the user may be music that is to be replayed or music (history) that has been replayed. For example, if it is possible to check, in advance, music that is to be replayed, the user is able to make a choice of musical compositions in advance, and even information on such operation may be used, as feedback, for analysis of the preference information.

5. SUPPLEMENTAL EXPLANATION

Supplemental explanation of the present embodiment will be given below.

In the music recommendation system according to the embodiment, it is possible to automatically switch the recommended musical composition lists from one to another depending on user situations, and automatically and sequentially replay the recommended musical compositions that fit the user situations. Specifically, for example, the music recommendation apparatus 6 may recognize a user situation in real time by acquiring the sensor data from the client terminal 1, and recommend music by using the music preference information acquired from the information processing apparatus 2. Alternatively, if the client terminal 1 has music recommendation lists that correspond to user situations and that are generated by the music recommendation apparatus 6, the client terminal 1 may recognize a user situation in real time, acquire musical compositions included in a corresponding recommended musical composition list from the music distribution apparatus 3, and replay the acquired musical compositions.

Furthermore, in the music recommendation system according to the present embodiment, it is possible to change a musical composition to be replayed next, on the basis of a reaction of the user to music that is currently replayed (machine learning may be used). For example, while the client terminal 1 replays musical compositions that are recommended at the time of running when the user is running, if it is determined that a health problem is likely to occur with an increase in the running speed on the basis of biological information (heartbeats, pitches, or the like) on the user, it may be possible to replay slow musical compositions with slow rhythm. Moreover, the client terminal 1 is also able to recognize the degree of concentration of the user on the basis of biological information on the user or the like, select music that fits the degree of concentration, and assist improvement in the degree of concentration. A process of changing to-be-relayed music in accordance with a real-time situation may be performed by the client terminal 1 or the music recommendation apparatus 6. Furthermore, if needed, it may be possible to replay music that is composed by the automatic composition apparatus 4 in real time. For example, it may be possible to automatically generate environmental music (ambient music) that improves the degree of concentration in real time and provide the music in accordance with a change in the degree of actual concentration of the user.

Moreover, the music recommendation system according to the present embodiment may select a musical composition to be recommended, by taking into account a charge limit for music replay. In other words, a musical composition licensed by a record company is to be charged, and therefore, if a charge limit is approaching, it may be possible to reduce the number of musical compositions to be charged and increase a percentage of automatically-composed musical compositions in accordance with the set charge limit.

Furthermore, in the analysis of the music preference information according to the present embodiment, reactions (behaviors) of the user with respect to the music that the user listens to are analyzed; however, "music that the user listens to" is not limited to music replayed by the client terminal 1, but includes ambient sounds that the user listens to. For example, when the user listens to music played around the user, such as sounds of trains, music played in stations, or music played in convenience-stores, the music is collected by a microphone included in the client terminal 1, and the music and sensor data on a reaction of the user, i.e., "information related to the music that the user listens to", are transmitted to the information processing apparatus 2. With this configuration, it becomes possible to recommend music that is automatically composed using sounds of trains that the user prefers, or recommend music that is played in stations or stores.

Moreover, the configuration of the music recommendation system according to the present embodiment is not limited to the example as illustrated in FIG. 1. For example, it may be possible to cause the client terminal 1 (i.e., at a local level) to analyze the preference information and recommend music. In this case, the client terminal 1 is able to recommend music in accordance with the situation and the preference of the user (the preference information including at least an evaluation on a part), from among a number of pieces of music data stored in the client terminal 1. In addition, even when music is recommended at the local level, it may be possible to periodically (for example, once a day, once a week, or the like) establish a connection to the information processing apparatus 2 to share information (preference information) with other users and update the preference information.

In the embodiment as described above, an example has been described in which music is used as a media content to be recommended, but the present embodiment is not limited to this example, and, for example, the media content may be a video (drama, movie, video, or a short movie), a game, or the like. It may be possible to replay the whole video including at least a part that the user prefers, or a part of a video corresponding to a preferred part, in accordance with a user situation.

6. CONCLUSION

As described above, in the information processing system according to the embodiment of the present disclosure, it is possible to analyze a user evaluation on a part of the content, and generate preference information capable of realizing satisfying content recommendation.

The user evaluation is associated with a content itself and also associated with at least a portion (part) of the content, and the preference information is tagged in a chronological order.

The preferred embodiment of the present disclosure has been described above with reference to the accompanying drawings, whilst the present technique is not limited to above examples. A person skilled in the art may conceive various alternations and modifications within the scope of the appended claims, and it should be understood that they will naturally come under the technical scope of the present disclosure.

For example, it may be possible to generate a computer program that causes the client terminal 1, the information processing apparatus 2, the music distribution apparatus 3, the automatic composition apparatus 4, or hardware, such as a CPU, a ROM, and a RAM, included in the music recommendation apparatus 6 to implement the functions of the client terminal 1, the information processing apparatus 2, the music distribution apparatus 3, the automatic composition apparatus 4, or the music recommendation apparatus 6. In addition, it may be possible to provide a computer-readable storage medium in which the computer program is stored.

Furthermore, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a control unit configured to generate a user evaluation on a chronologically-separated part of a media content, on the basis of sensor data on a user, the sensor data being acquired in relation to listening and viewing of the media content, and store media preference information including at least the generated user evaluation in a storage unit.

(2)

The information processing apparatus according to (1), in which the control unit associates, as the media preference information, a user situation that is obtained from the sensor data with a user evaluation on the part.

(3)

The information processing apparatus according to (2), in which the media content is music, and the chronologically-separated part of the media content is a musical part including at least one of melody, rhythm, and harmony.

(4)

The information processing apparatus according to (3), in which the control unit generates preference information for each of user groups that are classified based on features of a plurality of users on the basis of the media preference information on each of the users.

(5)

The information processing apparatus according to (3) or (4), in which the media preference information is used to recommend music to a user.

(6)

The information processing apparatus according to (5), in which the control unit selects, as a recommended musical composition, music that includes at least a musical part indicated by preference information corresponding to a user situation, on the basis of the media preference information.

(7)

The information processing apparatus according to (3) or (4), in which the media preference information is used to automatically compose music to be recommended.

(8)

The information processing apparatus according to (7), in which the control unit generates music using at least a musical part indicated by preference information corresponding to a user situation, on the basis of the media preference information.

(9)

The information processing apparatus according to (3) or (4), in which the media preference information is used to provide advertising to a user.

(10)

The information processing apparatus according to any one of (3) to (9), in which the media preference information includes a user evaluation on one of a music genre, a composer, and a singer.

(11)

The information processing apparatus according to (5) or (6), in which the control unit causes a client terminal to provide a list of musical compositions that are recommended in accordance with a user situation by using the media preference information.

(12)

The information processing apparatus according to (11), in which, in a presentation screen of a list of recommended musical compositions, a corresponding user situation is clearly indicated together with a list of musical compositions.

(13)

The information processing apparatus according to (5) or (6), in which the control unit recognizes a user situation in real time and causes a client terminal to replay a musical composition on the basis of a corresponding list of recommended musical compositions.

(14)

An information processing method of causing a processor to execute:

generating a user evaluation on a chronologically-separated part of a media content, on the basis of sensor data on a user, the sensor data being acquired in relation to listening and viewing of the media content, and storing media preference information including at least the generated user evaluation in a storage unit.

(15)

A program causing a computer to function as a control unit that executes:

generating a user evaluation on a chronologically-separated part of a media content, on the basis of sensor data on a user, the sensor data being acquired in relation to listening and viewing of the media content, and storing media preference information including at least the generated user evaluation in a storage unit.

REFERENCE SIGNS LIST

1 CLIENT TERMINAL
2 INFORMATION PROCESSING APPARATUS
3 MUSIC DISTRIBUTION APPARATUS
4 AUTOMATIC COMPOSITION APPARATUS
5 VARIOUS MUSIC DATA DBs
6 MUSIC RECOMMENDATION APPARATUS
7 RECORD COMPANY SERVER
20 CONTROL UNIT
201 BEHAVIOR ANALYSIS UNIT
202 MUSICAL PART ANALYSIS UNIT
203 MUSIC PREFERENCE ANALYSIS UNIT
21 COMMUNICATION UNIT
22 STORAGE UNIT
221 USER BEHAVIOR INFORMATION DB
222 MUSIC PREFERENCE INFORMATION DB

The invention claimed is:

1. An information processing apparatus comprising:
processing circuitry configured to
generate a user evaluation on a chronologically-separated part of a media content, on a basis of sensor data on a user at a time of the chronologically-separated part of the media content, the sensor data being acquired in relation to listening and viewing of the media content at the time of the chronologically-separated part of the media content and reflecting an emotional change of the user during listening of the media content, and store media preference information including at least the generated user evaluation in a storage unit, wherein the chronologically-separated part of the media content includes a portion of a musical composition having a first tone, the processing circuitry is further configured to generate the user evaluation on the portion of the musical composition on a basis of the sensor data on the user at the time of the chronologically-separated part of the media content, associate the media preference information with a user situation that is obtained from the sensor data at a time the user is listening to the portion of the musical composition with a user evaluation on the portion of the musical composition, and automatically compose a portion of music having a second tone similar to the first tone to be recommended based on a current user situation recognized in real time corresponding to the user situation associated with the media preference information with respect to the portion of the musical composition having the first tone, the current user situation and the user situation associated with media preference information being at different times, the portion of music to be recommended and the portion of the musical composition include at least one of melody, rhythm, or harmony, and the sensor data is derived from a biological sensor.

2. The information processing apparatus according to claim 1, wherein the processing circuitry is further configured to generate preference information for each of user groups that are classified based on features of a plurality of users on a basis of the media preference information on each of the users.

3. The information processing apparatus according to claim 1, wherein the media preference information is used to recommend music to a user.

4. The information processing apparatus according to claim 3, wherein the processing circuitry is further configured to select, as a recommended musical composition, music that includes at least a musical part indicated by preference information corresponding to a user situation, on a basis of the media preference information.

5. The information processing apparatus according to claim 1, wherein the media preference information is used to provide advertising to a user.

6. The information processing apparatus according to claim 1, wherein the media preference information includes a user evaluation on one of a music genre, a composer, and a singer.

7. The information processing apparatus according to claim 3, wherein the processing circuitry is further configured to cause a client terminal to provide a list of musical compositions that are recommended in accordance with a user situation by using the media preference information.

8. The information processing apparatus according to claim 7, wherein, in a presentation screen of a list of recommended musical compositions, a corresponding user situation is clearly indicated together with a list of musical compositions.

9. The information processing apparatus according to claim 3, wherein the processing circuitry is further configured to recognize a user situation in real time and cause a client terminal to replay a musical composition on a basis of a corresponding list of recommended musical compositions.

10. An information processing method of causing a processor to execute:

generating a user evaluation on a chronologically-separated part of a media content, on a basis of sensor data on a user at a time of the chronologically-separated part of the media content, the sensor data being acquired in relation to listening and viewing of the media content at the time of the chronologically-separated part of the media content and reflecting an emotional change of the user during listening of the media content, and storing media preference information including at least the generated user evaluation in a storage unit, wherein the chronologically-separated part of the media content includes a portion of a musical composition having a first tone, the generating of the user evaluation includes generating the user evaluation on the portion of the musical composition on a basis of the sensor data on the user at the time of the chronologically-separated part of the media content, associating the media preference information with a user situation that is obtained from the sensor data at a time the user is listening to the portion of the musical composition with a user evaluation on the portion of the musical composition, and automatically composing a portion of music having a second tone similar to the first tone to be recommended based on a current user situation recognized in real time corresponding to the user situation associated with the media preference information with respect to the portion of the musical composition having the first tone, the current user situation and the user situation associated with media preference information being at different times, the portion of music to be recommended and the portion of the musical composition include at least one of melody, rhythm, or harmony, and the sensor data is derived from a biological sensor.

11. A non-transitory computer-readable medium having embodied thereon a program, which when executed by a computer causes the computer to execute an information processing method, the method comprising:

generating a user evaluation on a chronologically-separated part of a media content, on a basis of sensor data on a user at a time of the chronologically-separated part of the media content, the sensor data being acquired in relation to listening and viewing of the media content at the time of the chronologically-separated part of the media content and reflecting an emotional change of the user during listening of the media content, and storing media preference information including at least the generated user evaluation in a storage unit, wherein the chronologically-separated part of the media content includes a portion of a musical composition having a first tone, the generating of the user evaluation includes generating the user evaluation on the portion of the musical composition on a basis of the sensor data on the user at the time of the chronologically-separated part of the media content, associating the media preference information with a user situation that is obtained from the sensor data at a time the user is listening to the portion of the musical composition with a user evaluation on the portion of the musical composition, and automatically composing a portion of music having a second tone similar to the first tone to be recommended based on a current user situation recognized in real time corresponding to the user situation associated with the media preference information with respect to the portion of the musical composition having the first tone, the current user situation and the user situation associated with media preference information being at different times, the portion of music to be recommended and the portion of the musical composition include at least one of melody, rhythm, or harmony, and the sensor data is derived from a biological sensor.

12. The information processing apparatus according to claim 1, wherein the sensor data includes biological information of the user at the time of the chronologically-separated part of the media content, and wherein the biological information includes at least one of a pulse, a heartbeat, a vein, diaphoresis, blood pressure, body temperature, breathing, brain wave, a fingerprint, or a vein pattern of the user.

13. The information processing apparatus according to claim 1, wherein the processing circuitry is further configured to select a recommended musical composition based on the media preference information including at least the generated user evaluation and media preference information for each of user groups that are classified based on features of a plurality of users being similar to a feature of the user.

14. The information processing apparatus according to claim 1, wherein the portion of music to be recommended is composed to be recommended as next playing media.

15. The information processing apparatus according to claim 1, wherein the sensor data includes at least one of a pulse, a heartbeat, diaphoresis, blood pressure, body temperature, breathing, brain wave, power saving, voice of speech, or motion.

16. The information processing apparatus according to claim 4, wherein the sensor data further includes a location of the user at the time of the chronologically-separated part of the media content, and the processing circuitry is further configured to display a map image on a display screen, wherein the map image reflects the location of the user and the recommended musical composition.

* * * * *